United States Patent

Kanbar et al.

[15] 3,697,036
[45] Oct. 10, 1972

[54] PATTY-FORMING DEVICE

[72] Inventors: Maurice S. Kanbar, 4 East 77th Street, New York, N.Y. 10021; Salvatore Benenati, 1603 Givan Avenue, Bronx, N.Y. 10469

[22] Filed: March 11, 1970

[21] Appl. No.: 18,547

[52] U.S. Cl. .................... 249/74, 17/32, 249/136, 249/158
[51] Int. Cl. ............................................. A22c 7/00
[58] Field of Search .............. 17/32; 249/74, 136, 158

[56] References Cited

UNITED STATES PATENTS

| | | | |
|---|---|---|---|
| 2,837,761 | 6/1958 | Stiegler | 17/32 UX |
| 2,008,725 | 7/1935 | Parker | 17/32 UX |
| 1,530,189 | 3/1925 | Miller et al. | 17/32 |
| 2,994,286 | 8/1961 | Mussari, Jr. | 17/32 X |

Primary Examiner—J. Spencer Overholser
Assistant Examiner—Lucius R. Frye
Attorney—Michael Ebert

[57] ABSTRACT

A food-patty-forming device in which moldable food, such as ground meat, is receivable within a molding cup and is caused to assume the shape thereof, the cup having an adjustable molding plate therein whose position relative to the base of the cup determines the thickness of the patty. The base of the cup is attached to one end of a cylinder serving as the handle of the device, a piston secured to the molding plate being telescoped within the device to an extent limited by an adjustable screw operated by a control knob projecting from the other end of the cylinder. The knob is calibrated in terms of patties per pound whereby the position of the molding plate may be set to provide a predetermined number of patties, all having the same thickness.

5 Claims, 5 Drawing Figures

PATENTED OCT 10 1972
3,697,036
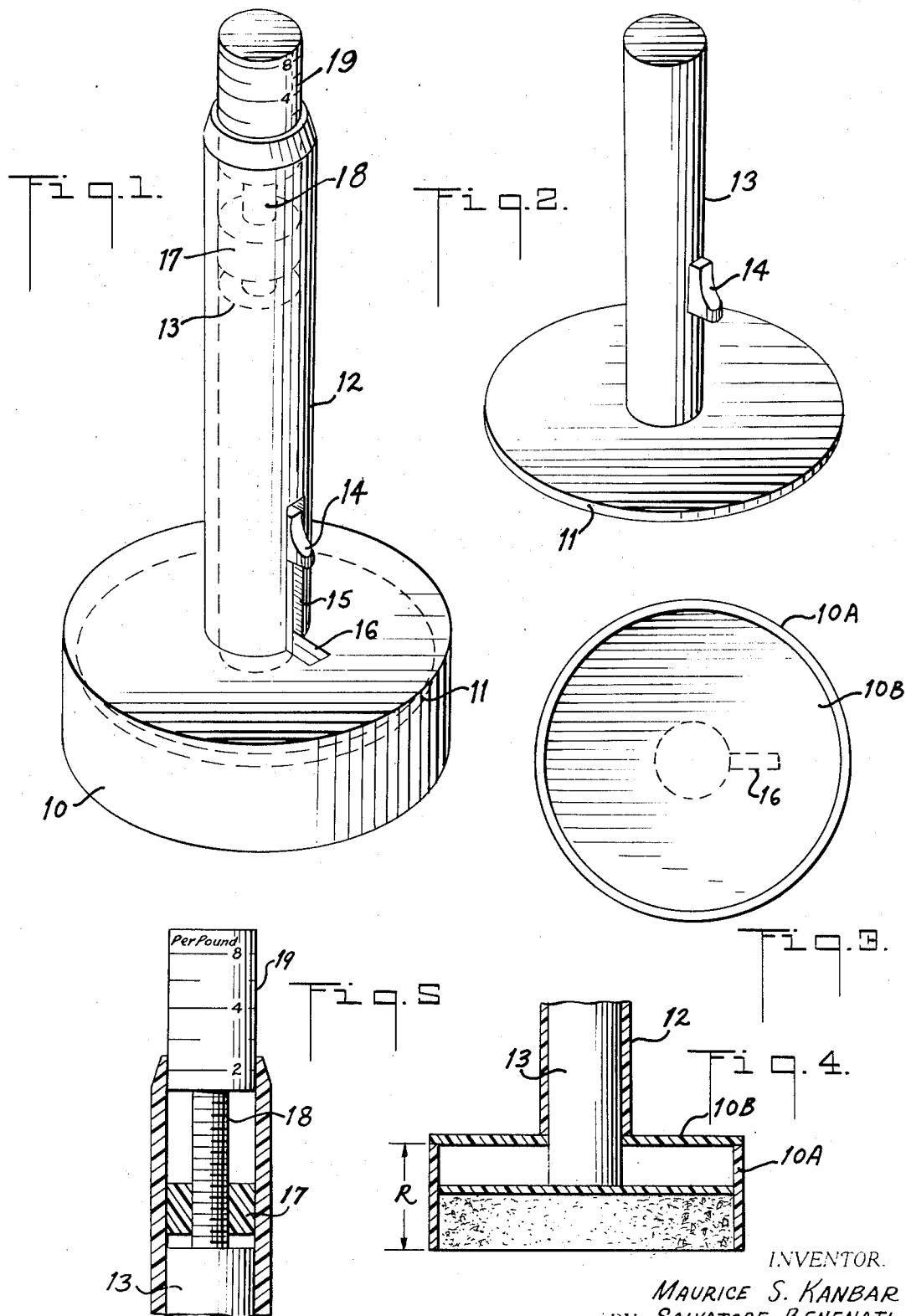
INVENTOR.
MAURICE S. KANBAR
BY SALVATORE BENENATI
ATTORNEY

PATTY-FORMING DEVICE

BACKGROUND OF INVENTION

This invention relates generally to food-patty-forming devices, and more particularly to a patty-former adapted to convert a known amount of ground food into a predetermined number of patties of like size.

Moldable food materials, such as ground beef, or ground fish, intermixed with vegetable, are often shaped into cakes or patties which are then cooked by frying or broiling. While the present invention will be discussed in the context of molding ground meat into hamburgers, it is to be understood that the forming device may be used in conjunction with any other type of food which is plastic in nature.

Hamburgers are generally served on a circular bun of standard size so that while one may prepare hamburger patties in various thicknesses, the diameter of the patty must remain unchanged. Though American households are equipped with a wide variety of ingenious labor-saving devices for mixing, stirring and processing food, there exists a curious deficiency in the area in greatest need. By far the most popular item on the American menu is the hamburger. In many homes, because of their low cost and high nutritional value, hamburgers are served four or five times a week. Yet the current domestic method of making hamburgers is still relatively primitive and unsatisfactory in many respects.

Thus the housewife will purchase two or three pounds of ground meat for her family meal, and then proceed to manually shape the meat into patties. But before undertaking this task, the housewife must first decide how many hamburgers are necessary, for this in turn determines the thickness to be imparted to each patty. For example, let us assume that two pounds of ground meat are available for a table of five and that the housewife wishes to serve two hamburgers per person. In order to afford each person an equal serving, the housewife must carefully divide the mass of ground meat into ten equal portions, and then, by hand, shape the portions into reasonably uniform patties.

While this seemingly simple task does not call for a high order of skill, it entails some judgement and is time-consuming. Faced with many distractions, a busy housewife will often make a rough guess as to the necessary amount of meat for each patty and then wind up short or with unequal patties. Moreover, even if the housewife has made a proper division of ground meat, she usually fails, unless quite careful, to shape each portion into a patty of the proper dimensions. Consequently, some patties are too large for the bun, while others may be inadequate. The existing hit-or-miss technique leaves much to be desired in the modern household.

SUMMARY OF INVENTION

In view of the foregoing, it is the main object of this invention to provide an adjustable food-patty-former adapted to convert a known amount of ground meat into a predetermined number of patties of like size. Thus, while each formed patty has the same diameter, its thickness is predetermined to afford a desired number of patties.

More specifically, it is an object of the invention to provide a patty-former of the above type including a molding cup for receiving a charge of ground meat and causing it to assume the shape of the cup, the depth of the cup being determined by a molding plate whose position relative to the base of the cup is adjustable.

A significant feature of the invention is that one may readily adjust the former by a simple turn of a knob to provide for each pound of ground meat any desired number of patties. Thus, where eight patties per pound are produced, these patties are all of the same thickness, but are thinner than patties derived from a setting of five patties per pound.

Also an object of the invention is to provide an adjustable patty-former which may be quickly dismantled and reassembled to facilitate cleaning and to maintain sanitary conditions.

Still another object of the invention is to provide a sturdy and reliable patty-former which expedites the shaping of uniform patties, and which may be manufactured and sold at low cost.

Briefly stated, these objects are attained in a food-patty-former in which moldable food is receivable within a molding cup whose diameter is appropriate to hamburgers and whose depth is determined by an adjustable molding plate, the position of which relative to the base of the cup determining the thickness of the patty. The base of the cup is attached to and communicates with one end of a cylinder serving as the handle of the device. A piston secured to the molding plate is slidable within the cylinder, the piston being manipulated by means of a finger piece which protrudes through a longitudinal slot in the cylinder, the movement of the piston being limited by an adjustable screw to an extent determined by a control knob projecting from the other end of the cylinder. The knob is calibrated in terms of patties per pound whereby the position of the molding plate may be pre-set to produce a predetermined number of patties, all of the same thickness.

OUTLINE OF DRAWING

For a better understanding of the invention, as well as other objects and further features thereof, reference is made to the following detailed description to be read in conjunction with the accompanying drawing, wherein:

FIG. 1 is a perspective view of a food-patty-former in accordance with the invention;

FIG. 2, in perspective, separately shows the molding plate and the piston of the device;

FIG. 3 is a bottom plan view of the molding cup;

FIG. 4 schematically illustrates the molding operation of the former; and

FIG. 5 shows the control knob arrangement of the patty-former.

DESCRIPTION OF INVENTION

Referring now to the drawing, and more particularly to FIGS. 1 and 3, a patty-former in accordance with the invention comprises a molding cup 10, a molding plate 11, a cylinder 12 and a piston 13.

Cup 10 is constituted by an annular shell 10A and a base 10B. The internal diameter of shell 10 is appropriate to the size of the patty to be formed which, in the case of a hamburger, matches that of a standard-size bun. The depth of cup 10, which is determined by the distance between the rim and base, exceeds the maximum thickness of the patties to be formed. The effective depth of the cup is adjustable by means of molding plate 11 in a manner to be later explained.

Molding plate 11 is disc-shaped and has a diameter slightly smaller than the internal diameter of the cup so that the plate is free to move therein and yet food placed in the cup cannot go beyond the plate. One end of cylinder 12 is attached to base 10B of the cup and communicates therewith through a central opening in the base. Piston 13 telescopes within cylinder 12, one end of the piston being attached to the plate at the center thereof.

Secured to piston 13 at about the midpoint thereof is a finger piece 14 which protrudes through a longitudinal slot 15 formed in cylinder 12. Slot 15 extends to base 10B of the cup and registers with a notch 16 formed in the base to permit the finger piece to pass therethrough. Thus the sub-assembly constituted by the molding plate and piston may be removed for cleaning simply by pulling out the piston from the cylinder. The patty-former may be just as quickly reassembled after cleaning by re-inserting the piston in the cylinder. While not shown in the drawing, one may use a split ring at the junction of the cylinder and base to intercept the finger piece and thereby prevent removal of the piston.

Fixedly disposed within cylinder 12 adjacent the upper end thereof is a nut 17 having a threaded bore. Passing through the bore is a screw 18 which terminates in a knob 19 projecting from the upper end of the cylinder. By turning knob 19 in one direction, screw 18 is advanced downwardly beyond nut 17 and by turning it in the reverse direction, the screw is retracted. Screw 18 serves as an abutment which engages the upper end of piston 13 and limits the extent to which the piston may slide upwardly into the cylinder. The slot 15 does not limit piston movement, for its length exceeds the range imposed by the screw.

As shown in FIG. 4 the displacement between molding plate 11 and base 10B of the molding cup is adjustable within a range R which extends from the base to a point adjacent the rim of the cup. The plate may be set to any position within this range by turning knob 19. Since the position of the molding plate relative to the base determines the effective depth of the cup, one may set the plate to produce patties of any desired thickness within the limits of the range.

In order, therefore, to produce any selected number of patties per pound of ground meat, knob 19 is calibrated as shown in FIG. 5 so that successive indicia indicate four to 10 patties per pound of meat. Inasmuch as a pound of ground meat has a known volume, the parameters of the adjustable patty-former may be made such as to afford incremental changes in depth producing patty thickness giving the desired number of patties per pound. The calibration shown is merely by way of illustration, and in practice other ranges may be used.

Thus the user, knowing how much meat is available and knowing how many patties are called for, has merely to adjust the nob to the appropriate setting. The user, holding the patty-former by the cylinder, then fills the mold cup with ground meat and evens off the surface. When this is completed, the user pushes up the piston with the finger piece to raise the patty from the mold cup, the patty being removed from the plate.

In practice, the former may be made of a low-cost, high-strength, synthetic, plastic material such as polypropylene, which has good heat resistance so that it may be cleaned and sterilized in hot water. The molding plate is preferably fabricated of Teflon or other material having non-stick properties to facilitate removal of the patty therefrom.

While there has been shown and described a preferred embodiment of a food-patty-former in accordance with the invention, it will be appreciated that many changes and modifications may be made therein without departing from the essential spirit of the invention.

We claim:

1. A food-patty-former comprising:
   A. a molding cup having an annular shell whose internal diameter is equal to the diameter of the patty to be formed therein, and a base joined to the shell and having an opening at the center thereof, said cup having a depth exceeding the thickness of the patty to be formed,
   B. a molding plate slidable within the cup relative to the base to vary the effective depth thereof,
   C. an open-ended cylinder having one end attached to the center of the base,
   D. a piston telescoping within said cylinder and attached to said plate,
   E. an adjustable abutment disposed in said cylinder to limit the movement of said piston toward the other end of the cylinder and thereby vary the setting of said plate relative to said base, said adjustable abutment being constituted by a screw passing through a nut fixedly mounted in said cylinder and terminating in a knob projecting from the other end of said cylinder whereby the longitudinal position of said screw in said cylinder may be varied by turning said knob, and
   F. means to manipulate the piston with respect to said cylinder to shift said plate outside of said cup to permit removal of the patty formed therein, said means being constituted by a finger piece attached to said piston and protruding through a longitudinal slot in said cylinder.

2. A former as set forth in claim 1, wherein said knob is calibrated in terms of patties per pound of ground meat.

3. A former as set forth in claim 1, further including a notch in said base in registration with said slot to admit said finger piece and permit removal of said piston.

4. A former as set forth in claim 1, wherein said plate is made of material having non-stick properties.

5. A former as set forth in claim 1, whereby said former is fabricated of polypropylene.

* * * * *